United States Patent
Gallick (12)

(10) Patent No.: US 6,678,359 B1
(45) Date of Patent: Jan. 13, 2004

(54) CALLED PARTY IDENTIFICATION IN PACKET SWITCHED NETWORKS

(75) Inventor: Robert Lawrence Gallick, Phoenix, AZ (US)

(73) Assignee: AG Communication Systems Corporation, Phoenix, AZ (US)

( * ) Notice: Subject to any disclaimer, the term of this patent is extended or adjusted under 35 U.S.C. 154(b) by 0 days.

(21) Appl. No.: 09/544,181

(22) Filed: Apr. 6, 2000

(51) Int. Cl.[7] .................................................. H04M 1/64

(52) U.S. Cl. ..................................... 379/88.17; 379/88.2

(58) Field of Search ......................... 379/210.02, 88.11, 379/88.17, 88.2, 93.01, 201.01, 207.15; 370/352–356

(56) References Cited

U.S. PATENT DOCUMENTS 6,477,246 B1 * 11/2002 Dolan et al. ............ 379/211.02

* cited by examiner

Primary Examiner—Creighton Smith

(57) ABSTRACT

In processing of VoIP calls, a called facility, prior to the cut through of ringing that would alert personnel to the presence of an incoming call, transmits previously stored information that identifies the persons at the called facility that are authorized to handle particular types of calls. In response to the receipt of caller-ID information, the called facility queries a database to determine whether (a) the caller is known and, if so, whether there are particular call handling instructions stored for this caller; and (b) whether the called facility is classified as blocked from participating in called party identification service. If the database response indicates that the called facility participates in called party identification service, the data base sends to the caller, before the call is answered, a list of persons at the called facility who are authorized to answer the call and, advantageously, some indication of what that persons area of responsibility may be. When one of the authorized persons answers the call a brief selection message is transmitted to the caller identifying which of the authorized persons is answering the call. For example, the person answering the call may simply press a button at his telephone corresponding to his name or, in an alternative embodiment, a speech sample from the answering person is analyzed and the selection message is sent based on the speech analysis. In the event that the call is not answered, the caller may, after reviewing the area of responsibility information on the list, select the most appropriate persons on the list to receive a detailed message.

9 Claims, 5 Drawing Sheets

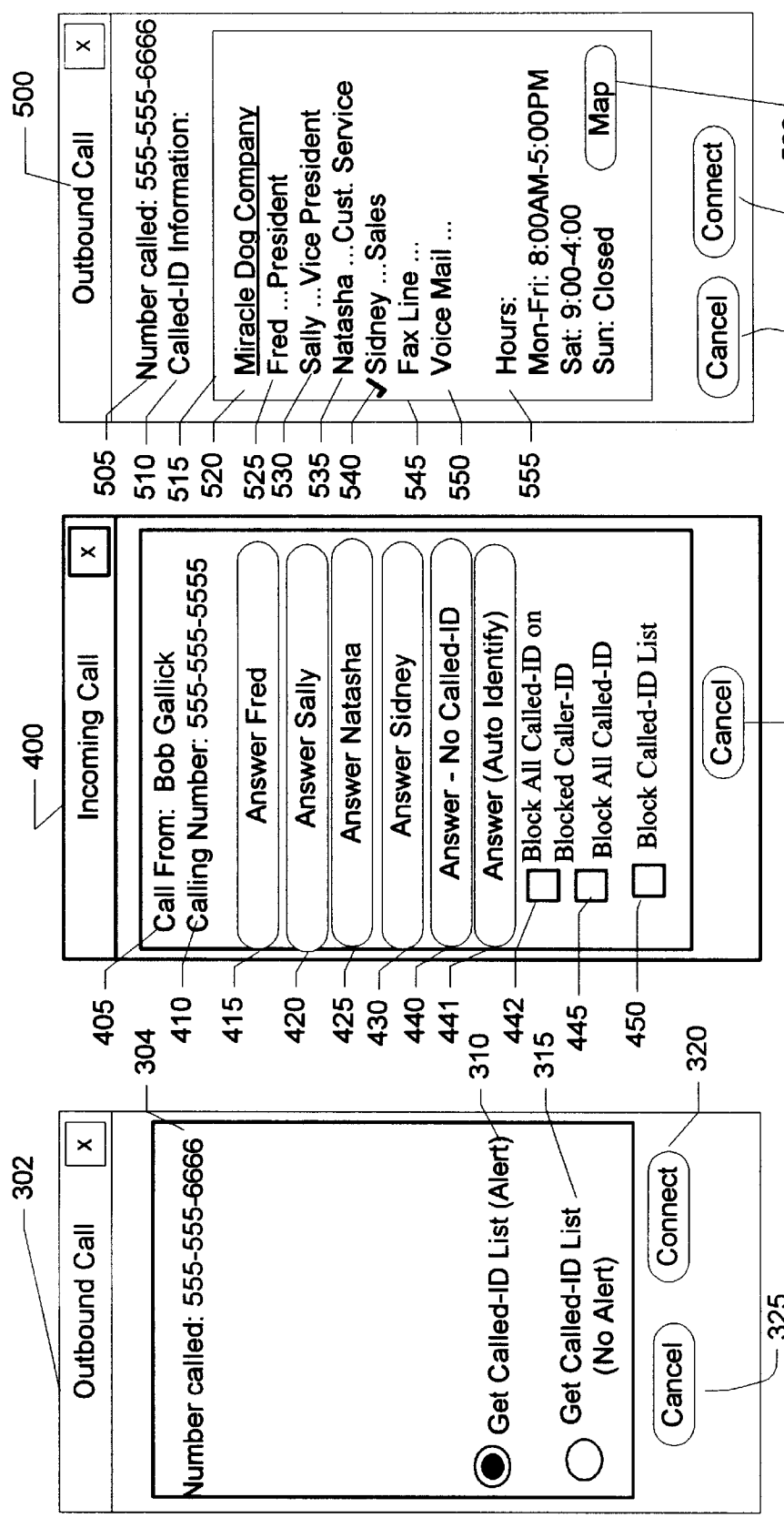

CALLED PARTY IDENTIFICATION IN PACKET SWITCHED NETWORKS

FIELD OF THE INVENTION

This invention relates to the identification of users of communications systems and, more particularly, to identification of the party answering a voice over internet telephone (VoIP) telephone call.

BACKGROUND OF THE INVENTION

In circuit switched telephony it is comparatively easy to identify a calling party's terminal by mapping the physical, central office location of the telephone line serving the terminal to a directory number. Once the calling terminal's directory number has been obtained, it may be forwarded to the called party, advantageously prior to answer or during a silent interval of ringing. In the prior art, voice over internet (VoIP) telephony which is transmitted over a packet switched network such as the Internet, software called "softphone" software is typically employed that conforms to the protocols defined in Recommendation H.323 of the International Telecommunications Union (ITU) entitled "Visual Telephone Systems and Equipment for Local Area Networks which Provide a Non-guaranteed Quality of Service". Neither circuit switched nor packet switched telephony, however, provides any means for identifying the party who answers the call. When the called telephone number is directed to a facility at which any of several individuals (e.g., family members or the employees of a small business) may answer a call it would be desirable to provide the caller with some indication of the identity of the person who actually answers the call. This would have several advantages. From the caller's perspective, it is desirable to know, without asking, who the person is who answers the call. From the standpoint of a business, providing the caller the name of the person who answers the call may dispel some of the aura of "faceless" communication that calls to some businesses seem to acquire and instead help the business to project an image of "personal service". Thus, it would be advantageous to provide the caller with the name of the person who actually answers the call. It would also be advantageous to allow the caller to leave a message for a particular person at a called facility, even when the caller has no knowledge before making the call who that person might be.

SUMMARY OF THE INVENTION

In accordance with the principles of the invention, the above problems are solved in an arrangement particularly adapted to VoIP calls, that provides Called Party Identification, i.e., which allows a called facility to provide the caller with information that identifies the person who answers the call without the need of the caller to ask and so that the answering individual may be distinguished from any other individual who may answer the call at the facility. According to one aspect of the invention, before an incoming call is answered, the called facility, if it receives caller-ID information, queries a database to determine whether (a) the caller is known and, if so, whether there are particular call handling instructions stored for this caller; and (b) whether the called facility is classified as blocked from participating in called party identification service. If the database response indicates that the called facility participates in called party identification service, the data base sends to the caller, before the call is answered, a list of persons at the called facility who are authorized to answer the call and, advantageously, some indication of what that persons area of responsibility may be. When one of the authorized persons answers the call a brief selection message is transmitted to the caller identifying which of the authorized persons is answering the call. For example, the person answering the call may simply press a button at his telephone corresponding to his name or, in an alternative embodiment, a speech sample from the answering person is analyzed and the selection message is sent based on the speech analysis. In the event that the call is not answered, the caller may, after reviewing the area of responsibility information on the list, select the most appropriate persons on the list to receive a detailed message.

BRIEF DESCRIPTION OF THE DRAWINGS

The foregoing and other features of the invention may become more apparent from a reading of the ensuing description together with the drawing, in which:

FIG. 3 depicts the calling party screen during an outgoing call;

FIG. 4 depicts the called party screen prior to receipt of an incoming call;

FIG. 5 depicts the calling party screen after the receipt of a called-ID message.

DESCRIPTION

Figure 1:
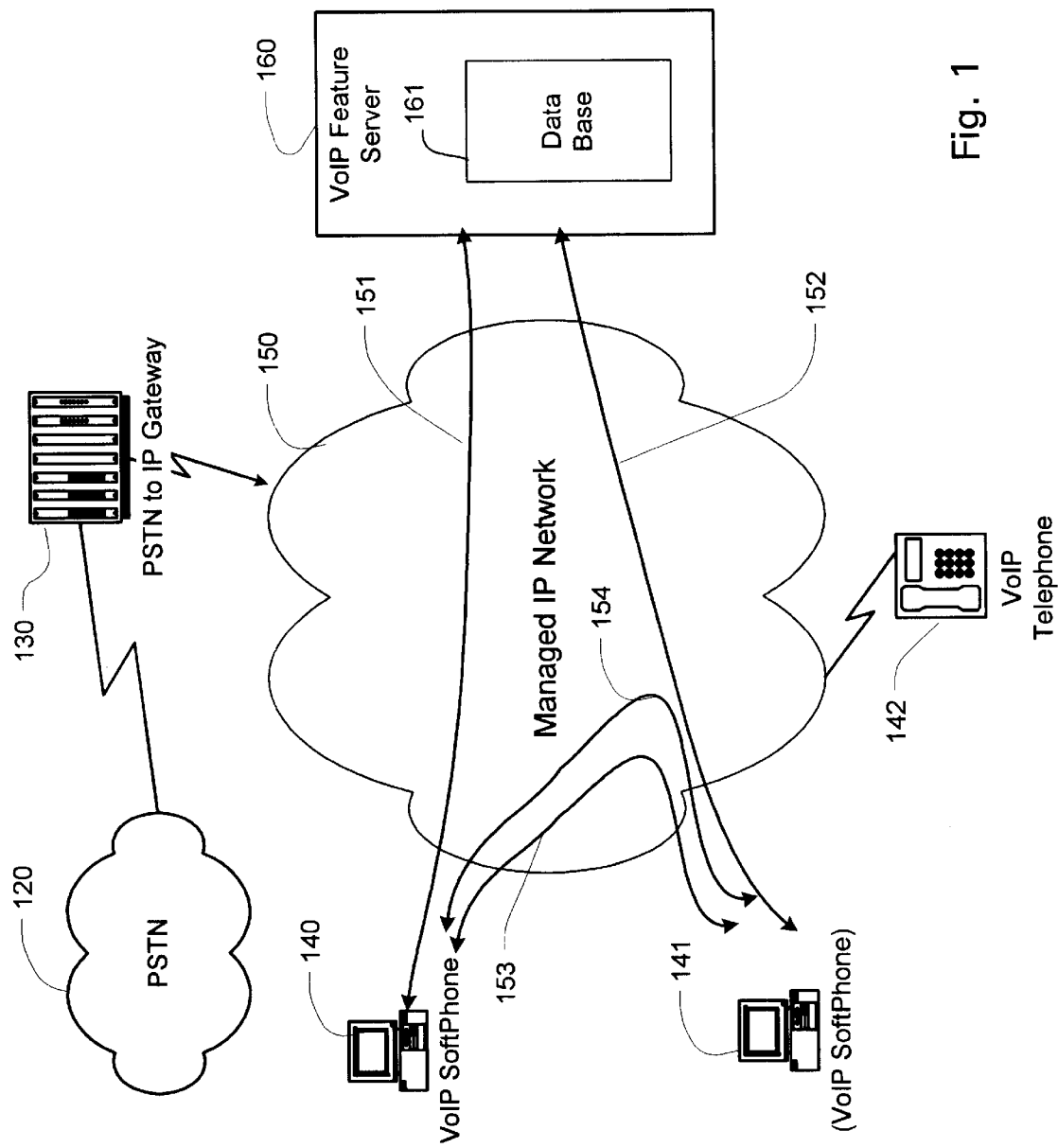
FIG. 1 is a functional block diagram illustrating a communications system which is arranged to provide called party identification service in accordance with the present invention.

FIG. 1 shows a packet switched IP network 150 to which a plurality of computer terminals 140, 141 running voice over IP (VoIP) "softphones" software and/or dedicated VoIP telephones 142 have access. Packet network 150 may include the functionality of the well-known Internet protocol and may be public or be a private, i.e., managed access, packet network. Access between IP network 150 and the public switched telephone network (PSTN) 120 may be effected via a conventional PSTN to IP gateway 130. Communications connections among computer terminals 140, 141 and VoIP telephones 170, 171 and connections between them and gateway 130 is regulated by feature server 160 which performs gatekeeper functions. Feature server 160 may advantageously employ the functionality of the feature server disclosed in co-pending application Ser. No. 09/511257, filed Feb. 23, 2000 entitled "Questionnaire Based Call Routing".

A conventional VoIP call from one terminal such as 140 to another terminal such as 141 would begin (assuming the aforementioned H.323 protocol is employed), with the calling terminal sending a limited bandwidth call control message 605 (see FIG. 6) called an admission request signal (ARQ) to the system gatekeeper (or, in the present application, a feature server 160 which acts as a VoIP gatekeeper). It should be apparent, however, that while the H.323 protocol is referred to in describing the illustrative embodiment, any similar VoIP protocol could be used. If the system gate keeper accepts the ARQ message, the gatekeeper confirms its acceptance by returning to the calling terminal an Admissions Confirm (ACF) call control message, followed by the gatekeeper providing the calling terminal with the called terminal's IP address. This is sufficient for the network to establish an end-to-end connection 153 between the calling and called terminals over which the bandwidth is limited only by the capacity of the network.

In accordance with the invention, the caller and called terminals are provided with graphical user interface (GUI) displays that allow the called facility to provide the caller with information and options useful in allowing the caller to designate how the call should be handled at the called facility. These GUIs are shown in FIGS. 3 through 5. In FIG. 3 the calling subscriber's softphone screen display is making an outbound call 302. The called PSTN number or IP address is indicated at 304. The display is provided with two option buttons, 310 and 315. If "Get called-ID List (No Alert)" is selected in 315, then a request will be made to the called facility to retrieve a list of personnel authorized to handle the various types of inquiries callers may make and to provide this list, and any other useful information, such as hours open for business, to the caller without alerting personnel at the called facility to the presence of the incoming call by an audible tone or an incoming message display at the called terminal. Alternatively, conventional alerting of the called party can be specified by the caller selecting button 310.

FIG. 4 illustrates the GUI screen display presented to the called facility. At 400 the presence of an incoming call is indicated. Caller-ID information, obtained from the H.323 setup message, is displayed at 405 and 410. A number of selectable icons are displayed representing any of the individuals at the called facility that are authorized to answer particular incoming call inquiries. These icons would be pre-programmed by the called subscriber prior to placing the system in operation to handle incoming calls. A number of icons illustrative of the type of information that would be useful to the caller are shown, including: "Answer Fred" 415, "Answer Sally" 420, "Answer Natasha" 425, and "Answer Sidney" 430. In addition, icons showing "Answer—No called-ID" 440 and "Answer (Auto Identify)" 441 are shown. When one of these icons is selected by the individual answering the call at the called facility, a message is sent to the caller identifying the answering individual.

If the call happens to be answered by an individual at the called facility whose name does not correspond to one of the available icons, button 441 can be selected in which event the call will be answered and the first utterances of the called party will be captured and analyzed to determine of the voice sample corresponds to one on file. If the called individual is identified, an appropriately formatted message will be transmitted to the calling subscriber. If the individual cannot be identified, an appropriate message indicating that the called party could not be identified is sent to the calling party.

The next option on the called facility GUI display is box 442, "Block All called-ID on Blocked Caller-ID". When this check box is checked, if the incoming call has not transmitted caller-id information in the setup message, no called-ID is transmitted back to the calling party whether or not caller-ID information has been transmitted. The next option shown is "Block All called-ID", box 445. If this option is selected, no called-Id information will be transmitted back to the calling party. If box 450, "Block called-ID List" is checked, the list of authorized individuals at the called facility will not be transmitted. If, however, the individual answering the call at the called facility has been identified that identity will be transmitted back to the calling subscriber. It should be obvious, that other derivative options could be created such as Block called-ID list to a particular list of callers to provide selective blocking of called-id to the calling party.

FIG. 5 shows the GUI screen displayed to the calling subscriber after the called-ID information has been transmitted to the caller containing additional useful information. 500 shows "Outbound Call" and the called number is shown at 505. A new label 510 appears indicating that the rest of the displayed information pertains to the called facility. 515 shows an instance of a "web" page window transmitted by the called facility to the caller. For example, the business name of the called facility, in this case, "Miracle Dog Company" appears at 520. The names and responsibilities of personal at the called facility authorized to handle particular types of inquiries are displayed at 525, 530, 535, and 540. The check mark 540 next to "Sidney . . . Sales" indicates that the call has been answered by an individual named "Sidney". In addition, the FAX line number of the called facility is displayed at 545 and a voice mail number is displayed at 550. The hours of operation of the called facility's business is displayed at 555 and an additional hyperlink 560 is displayed to provide the map location of the business. Since the display has been formatted as a web page by the called subscriber any additional information desired may be transmitted via hyperlinks.

It should be noted that all of the information indicated (except the identity of the individual who actually answers the call) is advantageously transmitted to the caller before personnel at the called facility need be notified of the presence of the incoming call and without the need of operator or telephone attendant intervention.

For completeness, icons depicting "Cancel" the call or "Connect" the call to the selected individual in the called-ID list is shown in 565 and 570 respectively. With the GUI displays of FIGS. 3–5 the caller may select the individual at the called facility with whom they which to speak and then, by selecting the "connect" button 570 cause the called facility to alert the indicated individual to the presence of the incoming call.

Figure 2A:
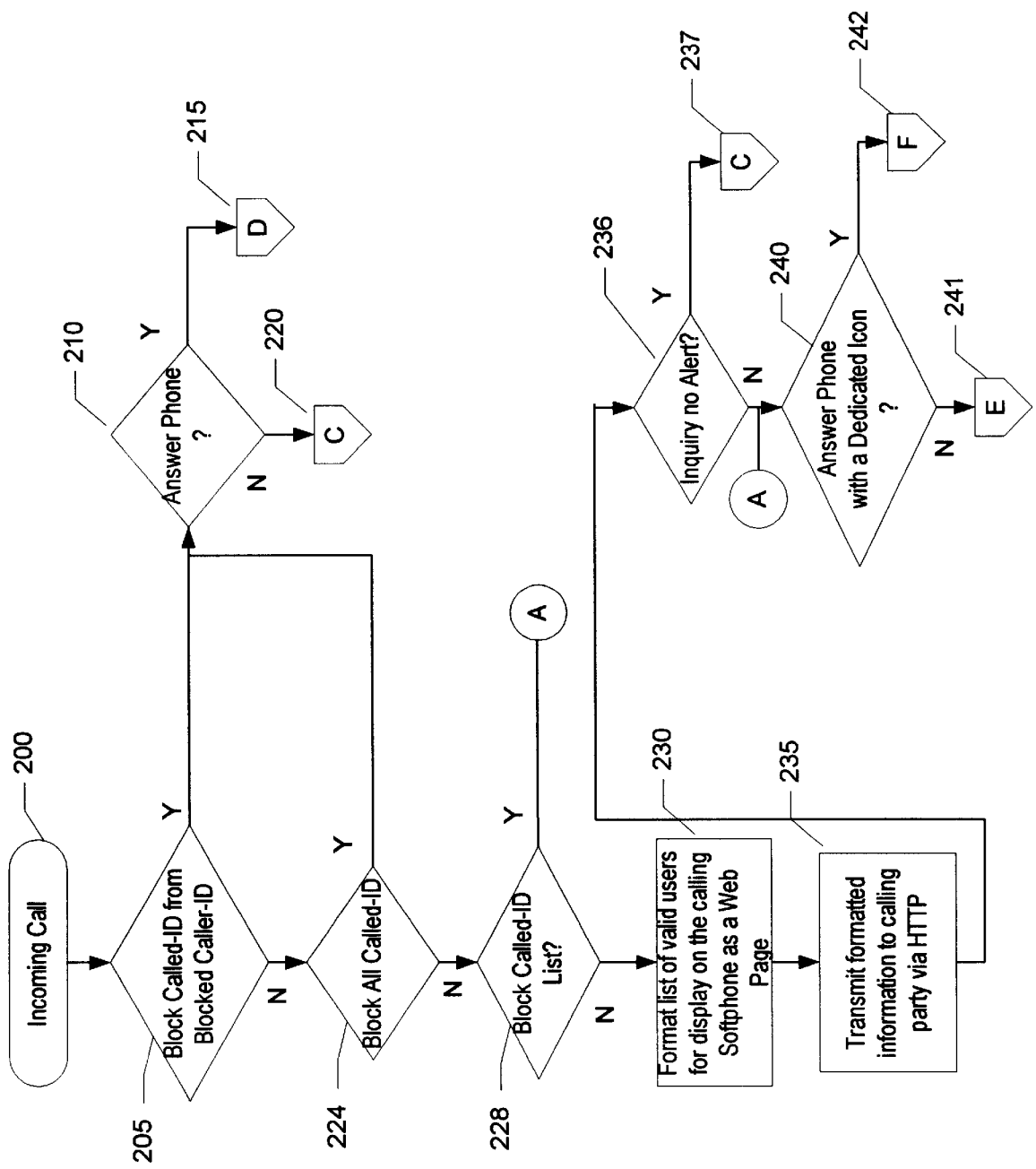
FIGS. 2a and 2b taken together are a flow chart showing the processing of a call incoming to the called facility.
Figure 2B:
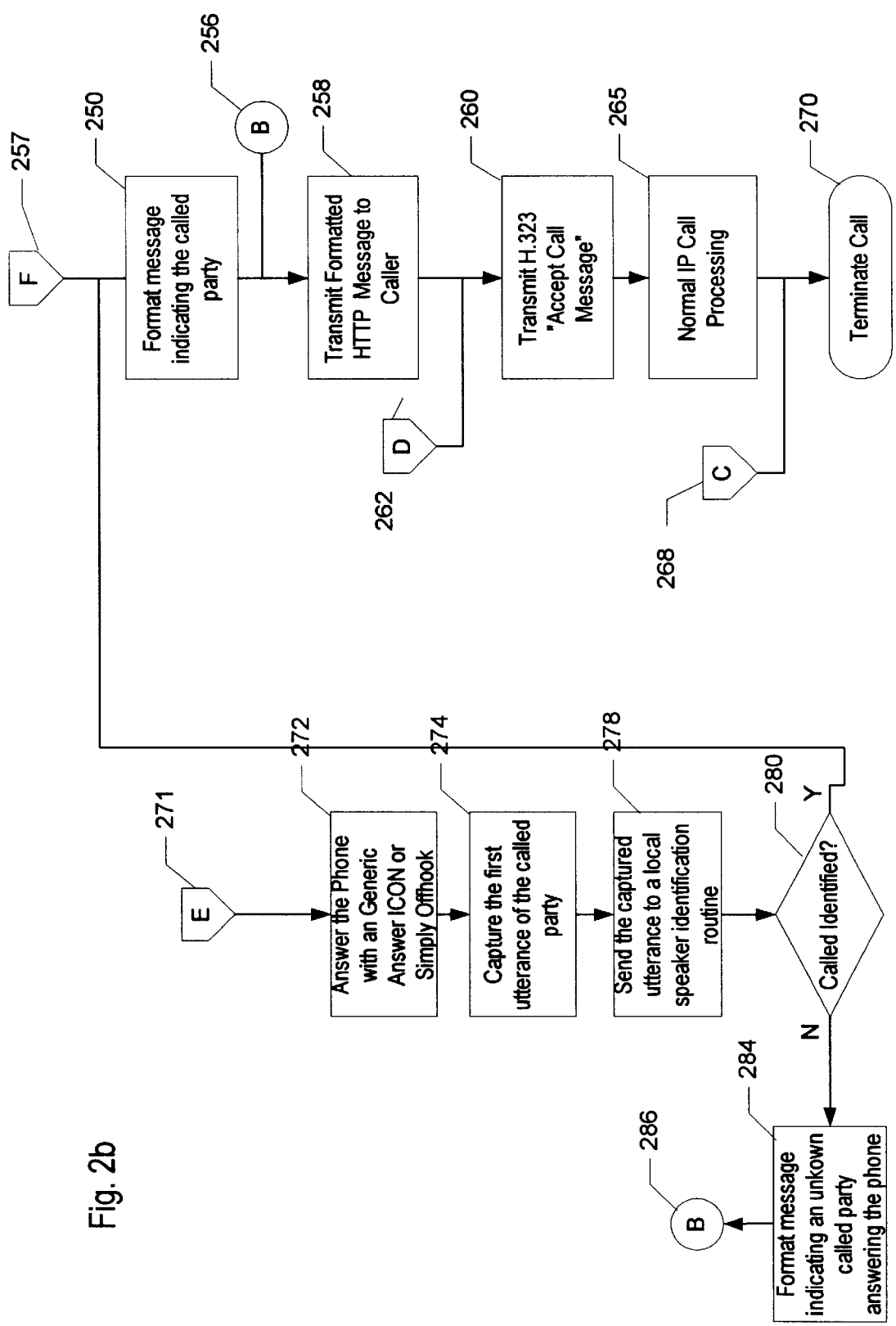

The sequence of operations initiated by the use of the option buttons in the GUI displays of FIGS. 3–5 are depicted in the flow diagram of FIGS. 2a and 2b. Processing of an incoming call begins at 200. At 205 a database lookup occurs based on incoming caller-ID information transmitted from the calling party. Such a database may be maintained locally or advantageously may be included in the functionality of feature server 160. For purposes of simplified illustration, the database will be deemed to be included in feature server 160 as database 161. However, it should be apparent that such a data base could be maintained on a terminal running a softphone software application.

It will be assumed that the customer at the called facility desires to have information pertinent to the called facility (e.g., the list of personnel authorized to handle specific types of calls, the hours that the facility is open for business, etc.) that has been loaded in the data base provided to the caller before the call is answered. The caller may then select a person from the list to direct the call to that person. When the call is answered, the person answering the call at the called facility presses a button at his terminal to identify himself to the caller. However, the customer may know in advance that certain callers do not need this information and, accordingly, database 161 stores a table listing calling party dialed numbers (DNs) or IP addresses for which called party identification information (called party-ID) is blocked.

From the incoming caller-ID information, table lookup determines whether the caller is one to whom called_ID information will not be transmitted. If table lookup indicates that called party-ID is blocked for this incoming call, control advances to step 210 where the called terminal will be alerted. If the call is not answered, control passes to step 220 where the call is terminated. If the called party answers the call, control proceeds to step D 262 (FIG. 2*b*) where an H.*323* "Accept Call" message 260 is transmitted to the calling party and conventional IP call processing steps 265 take place pertaining to VoIP call setup and connection which need not be detailed here. At the conclusion of the telephone call, the call is terminated at 270.

If table lookup at step 205 indicates that called-ID is not blocked for this caller, processing continues to step 224 to determine if the customer at the called facility has marked box 445 on the terminal display, FIG. 4, to block all called-ID. If "Block All called-ID" has been selected by the called subscriber, then the logic follows the same path as was previously described for Block called-ID on Blocked Caller-ID.

Processing continues to step 228 in FIG. 2*a* which checks whether the party at the called facility had checked screen display box 450, FIG. 4 "Block called-ID List". When box 450 has been checked, no information pertaining to the called subscriber is transmitted to the calling subscriber prior to the alerting of the called subscriber. When the called subscriber answers after being alerted, step 240, and is successfully identified, the identification is forwarded to the caller.

If box 450 FIG. 4 had not been checked, processing in FIG. 2*a* continues to step 230 which formats the information that the customer at the called facility desires to be presented to the caller. This information may advantageously be formatted using http protocol in the same way that a "Web" page display is formatted for transmission over an IP network and is transmitted to the caller's terminal at step 235. The information, see FIG. 5, may advantageously include the business name of the called facility, i.e., "Miracle Dog Company" 520; a list of personnel authorized to answer the call and their position 525–540; hours of business 555; hypertext links to additional information, such as "map" 560; as well as any text, graphic, or multimedia information, which may be commonly associated with a "web" page. In addition to this information, the terminal display effected at the caller's terminal is presented with some "radio" button options to allow the caller to control the call, as will hereinafter be explained.

Processing in FIG. 2*a* then proceeds to step 236. At this point, the program determines if the calling subscriber had selected one of the buttons (e.g., 315, FIG. 3) indicating a desire not to alert the called subscriber until the information that had been transmitted in step 235 has been studied. If this option has been selected, the program jumps to off-page connector C to indicate that processing continues in FIG. 2*b* where the call would simply terminate using conventional H.323 call termination. If the caller has selected this option, the caller can later cause the call to be completed by pressing the "connect" button 320, FIG. 3.

If the answer to step 236 is "no", the logic proceeds to 240 in FIG. 2*a* and the called subscriber is alerted to the incoming call. If the called subscriber answers the phone by selecting one of the dedicated icons, such as those shown in FIG. 4 at 415, 420, 425, or 430, the logic continues to off-page connector F and to FIG. 2*b* where a message is formatted at step 250 with the name associated with the selected icon, such as "Sidney". The message, which is actually part of a Web page, is transmitted via http at step 258. The call would proceed as normal, and would terminate on disconnect at 270 FIG. 2*b*.

The user at the called facility has the option to answer the call without selecting one of the dedicated icons by selecting option button 440 "Answer—Auto Identify" in which case processing continues at E, FIG. 2*b*. At this point the first utterance of the answering called party is captured and voice identification software analyzes the speech to identify the person answering the call at the called facility. For example, the called subscriber may answer "Miracle Dog Company" or simply "Hello". This phrase would be captured and in 274 and sent to a local voice identification recognizer located on the local personal computer where the softphone resides or on a server on the network where the softphone resides. If the voice of the party answering is identified at step 280, a message is formatted at step 250 which identifies the answering party and the formatted message is transmitted to the caller via HTTP in step 258. Thereafter, the call proceeds as normal and, on disconnect, the call would terminate at 270.

If the answering party was not identified at step 280, a message indicating an "Answering Party Could not be identified" would be formatted at step 284. The logic continues to on-page connector B where the message would be transmitted via HTTP in 258. Call processing would continue as has been previously described.

Figure 6:
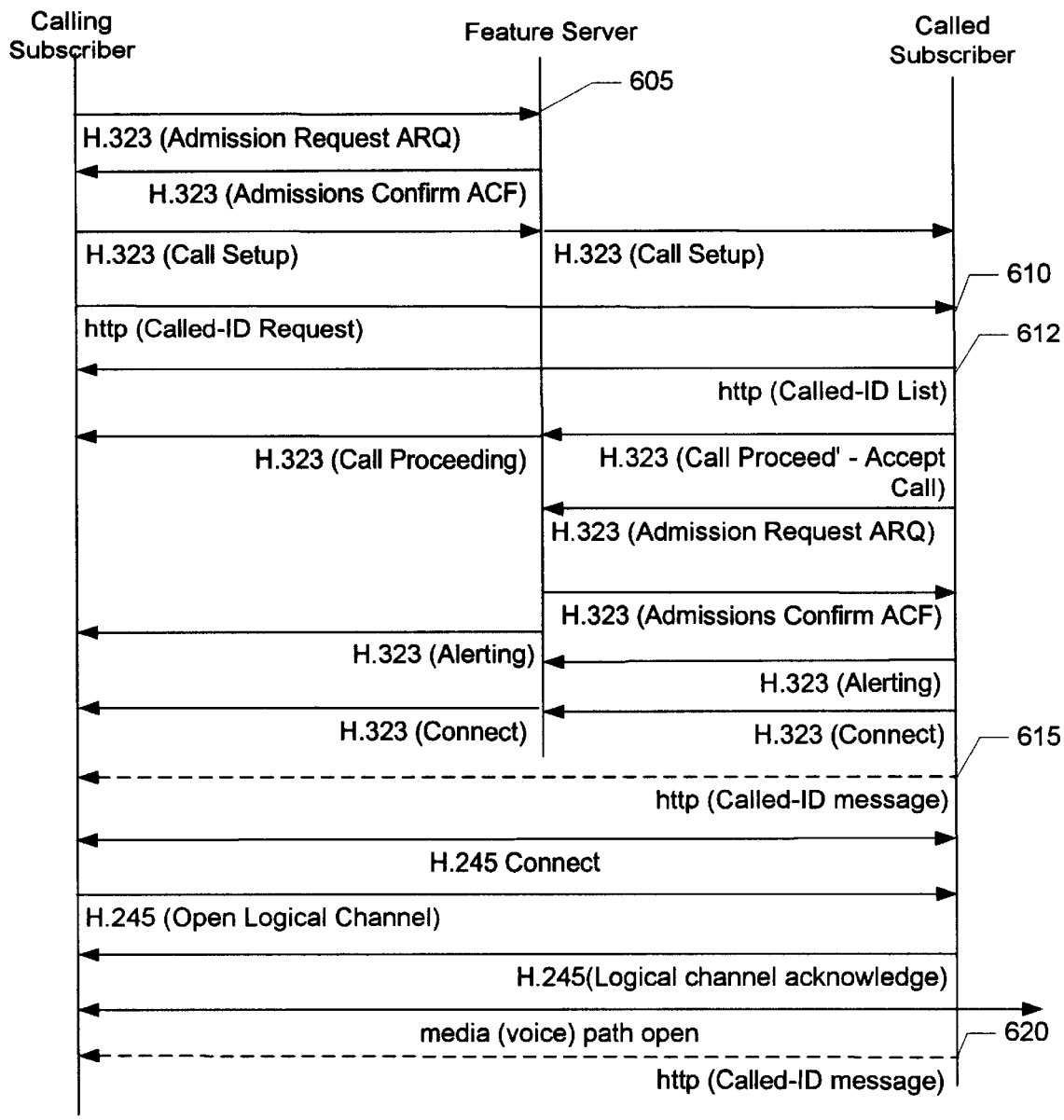
FIG. 6 is a chart of messages passed in performing called-ID.

FIG. 6 shows the message flow for the called-ID implementation. After the H.323 admissions confirmation in 605, feature server 160 sends the IP address to the calling party. At that point, a normal H.323 call setup would continue with messages being sent from the calling party to the called subscriber. The setup up will contain the caller-id (i.e. name) of the calling party as well as the calling subscribers' IP address. Concurrently, in 610 a request for called-ID information is sent from the calling subscriber to the called subscriber. This message will take on the form: http://called_party_IP_address/feature.asp?Command=called_ID. In response, the called subscribers' softphone transmits a web page to the calling subscriber's softphone containing the called-ID information. The list is not transmitted if called-ID is blocked by the called party. If the called-ID subscriber answers the phone by pressing a unique icon identifying themselves (such as Sidney), then another out of band message can be sent to the calling party before the audio path is setup as is shown in 615. This message would be an HTTP message with the data "Sidney" encapsulated in it. If the subscriber chooses to answer the phone and speaking—allowing the speaker identification software to identify them, then the audio path would proceed to be connected and the message shown in 615 would not be sent. Instead, the first utterances of the called party would be captured and sent to caller verification routines for an attempted identification of the called party. If successful, an out of band message would be sent at 620 back to the calling party indicating the party speaking at the called telephone instrument. In this case, "Sidney". If the called party could not be identified by the speaker identification software, a message formatted with "Unidentified Caller" or similar would be transmitted out of band to the calling party.

If the calling party was determined to be calling from a handheld device such as a cellular phone with a display, the program at the called facility or feature server will transmit the information to the calling instrument in a format capable of being displayed on such a device such as Handheld Device Markup Language (HDML). (The type of device being used by the caller is one of the items of information furnished in accordance with H.323 protocol.) It should also be evident that this called-ID information may be transmitted to calling telephones served by the PSTN where the calling party has an Analog Display Services Interface (ADSI) or other display device with similar capabilities, in which case the information would be transmitted as an FSK message. It would also have to filter to the content from that of a graphical nature to that of a text display. Further and other modifications will be apparent to those skilled in the art and may be made without, however, departing from the spirit and scope of the invention.

What is claimed is:

1. A method of processing voice over internet protocol calls, comprising the steps of:

storing in a database graphically encoded information pertaining to individuals at a called facility who are authorized to handle different types of calls directed to said facility;

querying said database in response to a call incoming to said facility;

transmitting said graphically encoded information to the caller's terminal associated with said call in order to enable said caller to make a selection among said individuals; and further processing said call in accordance with said selection thereafter made by said caller.

2. A method of processing calls according to claim 1 wherein said graphically encoded information is formatted for transmission to said caller's terminal as a web page.

3. A method of processing calls according to claim 1 wherein said graphically encoded information is transmitted prior to alerting personnel at said called facility to the presence of said incoming call.

4. A method of processing calls according to claim 3 wherein said information includes a plurality of icons identifying said authorized individuals.

5. A method of processing calls according to claim 4 wherein a person answering a call at said facility is identified and wherein one of said plurality of icons transmitted to said caller's terminal is illuminated corresponding to said identified person.

6. A method of processing calls according to claim 5 wherein said person answering a call at said facility is identified by voice analysis.

7. A method of processing calls according to claim 6 wherein said plurality of icons is displayed to a person answering a call at said facility for selection of an icon to be illuminated at said caller's terminal.

8. A method of processing calls according to claim 3 wherein said further processing includes receiving from a caller a voice message to be stored for individual at said facility designated by said selection.

9. A method of processing calls according to claim 3 further including means for storing an indication to block transmission of said stored graphical information to particular callers.

* * * * *